Patented Aug. 4, 1953

2,647,889

UNITED STATES PATENT OFFICE 2,647,889

PREPARATION OF BARIUM SALTS OF PHOSPHORUS SULFIDE-HYDROCARBON REACTION PRODUCTS

Roger W. Watson, Highland, Ind., and Clair R. Ditto, Alton, Ill., assignors to Standard Oil Company, Chicago, Ill., a corporation of Indiana No Drawing. Application December 16, 1950, Serial No. 201,252

8 Claims. (Cl. 260—139)

The present invention relates to improvements in the preparation of neutralized reaction products of a phosphorus sulfide and a hydrocarbon, and more particularly is directed to improvements in neutralizing the reaction products of a phosphorus sulfide and a hydrocarbon with an alkaline barium compound.

Neutralized reaction products of a phosphorus sulfide and a hydrocarbon, particularly olefin polymers, are extensively used as lubricant additives in the preparation of improved lubricants for internal combustion engines. The use of such materials in lubricant compositions is described in U. S. Patents Nos. 2,316,080 and 2,316,082, issued April 6, 1943, to Clarence M. Loane and James W. Gaynor. The specifications of these patents disclose a neutralization of phosphorus sulfide-olefin polymer reaction products and phosphorus sulfide-hydrocarbon reaction products by treatment with various neutralizing agents, including basic alkaline earth compounds at about 400° F. While, in general, no difficulty is encountered in neutralizing such reaction products in the manner heretofore practiced, it has been observed that when neutralizing such reaction products with a basic barium compound, difficulty is encountered in obtaining efficient and effective neutralization of the reaction product.

It is an object of the present invention to provide a method of more efficiently neutralizing reaction products of a phosphorus sulfide and a hydrocarbon with a basic barium compound. Another object of the invention is to provide an improved method of preparing polymers containing neutralized reaction products of a phosphorus sulfide and a hydrocarbon. Still another object of the invention is to provide a method of increasing the utilization of barium hydroxide used in the neutralization of reaction products of a phosphorus sulfide and an olefin polymer. Other objects and advantages of the present invention will become apparent from the following description thereof.

In accordance with the present invention the foregoing objects can be attained by carrying out the neutralization of the reaction products of a phosphorus sulfide and a hydrocarbon, particularly olefin polymers, with a basic barium compound, particularly barium hydroxide, at a temperature within the range of 220° F. to about 300° F., while introducing steam into the reaction mixture.

In the preparation of the phosphorus sulfide-hydrocarbon reaction product, the hydrocarbon is reacted with a phosphorus sulfide, such as $P_2S_3$, $P_4S_3$, $P_3S_7$, or other phosphorus sulfides, and preferably phosphorus pentasulfide, $P_2S_5$.

The hydrocarbon constituent of this reaction is preferably a mono-olefin hydrocarbon polymer resulting from the polymerization of low molecular weight mono-olefinic hydrocarbons or iso-mono-olefinic hydrocarbons, such as propylenes, butylenes and amylenes, or the copolymers obtained by the polymerization of hydrocarbon mixtures containing iso-mono-olefins and mono-olefins of less than 6 carbon atoms. The polymers may be obtained by the polymerization of these olefins or mixtures of olefins in the presence of a catalyst such as sulfuric acid, phosphoric acid, boron fluoride, aluminum chloride or other similar halide catalysts of the Friedel-Crafts type.

The polymers employed are preferably mono-olefin polymers or mixtures of mono-olefin polymers and iso-mono-olefin polymers having molecular weights ranging from about 500 to about 50,000, or more, and preferably from about 600 to about 10,000. Such polymers can be obtained, for example, by the polymerization in the liquid phase of a hydrocarbon mixture containing mono-olefins and iso-mono-olefins, such as butylene and isobutylene at a temperature of from about —80° F. to about 100° F., in the presence of a metal halide catalyst of the Friedel-Crafts type such as for example, boron fluoride, aluminum chloride, and the like. In the preparation of these polymers, we may employ for example, a hydrocarbon mixture containing isobutylene, butylenes and butanes recovered from petroleum gases, especially those gases produced in the cracking of petroleum oils in the manufacture of gasoline.

A suitable polymer for the reaction with phosphorus sulfide is the product obtained by polymerizing in the liquid phase a hydrocarbon mixture containing butylenes and isobutylenes together with butanes and some $C_3$ and $C_5$ hydrocarbons at a temperature between about 0° F. and 30° F., in the presence of aluminum chloride. A suitable method for carrying out the polymerization is to introduce the aluminum chloride into the reactor and introduce the hydrocarbon mixture cooled to a temperature of about 0° F. into the bottom of the reactor and pass it upwardly through the catalyst layer while regulating the temperature within the reactor so that the polymer product leaving the top of the reactor is at a temperature of about 30° F. After separating the polymer from the catalyst sludge and unreacted hydrocarbons the polymer is fractionated to obtain a fraction of the desired viscosity, such as for example, from about 80 seconds to about 2000 seconds Saybolt Universal at 210° F.

Another suitable polymer is that obtained by polymerizing in the liquid phase a hydrocarbon mixture comprising substantially C₃ hydrocarbons in the presence of an aluminum chloride-complex catalyst. The catalyst is preferably prepared by heating aluminum chloride with isooctane. The hydrocarbon mixture is introduced into the bottom of the reactor and passed upwardly through the catalyst layer, while a temperature of from about 50° F. to about 110° F. is maintained in the reactor. The propane and other saturated gases pass through the catalyst while the propylene is polymerized under these conditions. The propylene polymer can be fractionated to any desired molecular weight, preferably from about 500 to about 1000, or higher.

Other suitable polymers are those obtained by polymerizing a hydrocarbon mixture containing about 10% to about 25% isobutylene at a temperature of from about 0° F. to about 100° F., and preferably 0° F. to about 32° F. in the presence of boron fluoride. After the polymerization of the isobutylene, together with a relatively minor amount of the normal olefins present, the reaction mass is neutralized, washed free of acidic substances and the unreacted hydrocarbons subsequently separated from the polymers by distillation. The polymer mixture so obtained, depending upon the temperature of reaction, varies in consistency from a light liquid to viscous, oily material and contains polymers having molecular weights ranging from about 500 to about 2000, or higher. The polymers so obtained may be used as such, or the polymer may be fractionated under reduced pressure into fractions of increasing molecular weights and suitable fraction obtained reacted with the phosphorus sulfide to obtain the desired reaction products. The bottoms resulting from the fractionation of the polymer, which may have Saybolt Universal viscosities at 210° F., ranging from about 50 seconds to about 10,000 seconds, are well suited for the purpose of the present invention.

Essentially paraffinic hydrocarbons such as bright stock residuums, lubricating oil distillates, petrolatums, or paraffin waxes, may be used. There can also be employed the condensation products of any of the foregoing hydrocarbons, usually through first halogenating the hydrocarbons, with aromatic hydrocarbons in the presence of anhydrous inorganic halides, such as aluminum chloride, zinc chloride, boron fluoride, and the like.

Examples of high molecular weight olefinic hydrocarbons which can be employed as reactants are cetene (C₁₆), cerotene (C₂₆), melene (C₃₀), and mixed high molecular weight alkenes obtained by cracking petroleum oils.

Other preferred olefins suitable for the preparation of the hereindescribed phosphorus sulfide reaction products are olefins having at least 20 carbon atoms in the molecule of which from about 13 carbon atoms to about 18 carbon atoms, and preferably at least 15 carbon atoms in a long chain. Such olefins can be obtained by the dehydrogenation of paraffins, such as by the cracking of paraffin waxes or by the dehalogenation of alkyl halides, preferably long chain alkyl halides, particularly halogenated paraffin waxes.

The olefins obtained by dehalogenation of long chain alkyl halides are preferably those obtained by dehydrohalogenation of monohalogenated waxes, such as for example, those obtained by dehydrochlorination of mono-chloroparaffin wax. The alkyl halides are decomposed to yield olefins according to the reaction $$C_nH_{2n+1}X \rightarrow HX + C_nH_{2n}$$

in which "$n$" is a whole number, preferably 20 or more, and $X$ is a halogen. It is preferred to employ paraffin waxes having at least about 20 carbon atoms per molecule, and melting points upwards from about 90° F. to about 140° F.

As a starting material there can be used the polymer or synthetic lubricating oil obtained by polymerizing the unsaturated hydrocarbons resulting from the vapor phase cracking of paraffin waxes in the presence of aluminum chloride which is fully described in United States Patents Nos. 1,995,260, 1,970,002 and 2,091,398. Still another type of olefin polymer which may be employed is the polymer resulting from the treatment of vapor phase cracked gasoline and/or gasoline fractions with sulfuric acid or solid adsorbents, such as fuller's earth, whereby unsaturated polymerized hydrocarbons are removed. Also contemplated within the scope of this invention is the treatment with phosphorus sulfide of the polymers resulting from the voltolization of hydrocarbons as described for example in U. S. Patents Nos. 2,197,768 and 2,191,787.

Also contemplated within the scope of the present invention are the reaction products of a phosphorus sulfide with an aromatic hydrocarbon, such as for example, benzene, naphthalene, toluene, xylene, diphenyl and the like or with an alkylated aromatic hydrocarbon, such as for example, benzene having an alkyl substituent having at least four carbon atoms, and preferably at least eight carbon atoms, such as long chain paraffin wax.

In general, the preparation of the phosphorus sulfide-hydrocarbon reaction product in accordance with the present invention is carried out in the following manner:

The hydrocarbon, such as for example, an olefinic polymer of the desired molecular weight, is reacted with from about 1% to about 50%, and preferably from about 5% to about 25%, of a phosphorus sulfide, e. g., P₂S₅ at a temperature of from about 200° F. to about 600° F. in a non-oxidizing atmosphere, such as for example, an atmosphere of nitrogen. The phosphorus sulfide reaction product can, if desired, be carried out in the presence of a sulfurizing agent as described in U. S. 2,316,087, issued to J. W. Gaynor and C. M. Loane April 6, 1943. The reaction product obtained is then hydrolzyed at a temperature of from about 200° F. to about 500° F., and preferably at a temperature of 300° F. to 400° F., by a suitable means, such as for example, by introducing steam through the reaction mass. The hydrolyzed product containing inorganic phosphor acids formed during the hydrolysis is preferably contacted with an adsorbent material, such as Attapulgus clay, fuller's earth, and the like, at a temperature of from about 100° F. to about 500° F., as more fully described and claimed in the copending application Serial No. 202,409 filed December 22, 1950, by Roger W. Watson, or contacted with a basic alkaline earth compound, such as lime, at a temperature of from about 100° F. to about 500° F., as described and claimed in the copending application Serial No. 202,410, filed December 22, 1950, by Roger W. Watson, and Morton Fainman, and the treated hydrolyzed product filtered to obtain a filtrate substantially free of inorganic phosphorus acids.

The hydrolyzed reaction product of phosphorus sulfide and hydrocarbon, preferably treated in the above manner, and substantially free of inorganic phosphorus acids is then neutralized by steaming at a temperature of 220° F. to about 300° F. in the presence of at least stoichiometric amounts of barium hydroxide. In order to obtain a phosphorus sulfide-hydrocarbon reaction product of maximum barium content, it is essential that the neutralization be carried out with steaming within the low temperature range. It has been found that conducting the neutralization under these conditions promotes the reaction of the barium hydroxide with the reaction product of a phosphorus sulfide and a hydrocarbon, as illustrated by the data in Table I. These data were obtained by adding barium hydroxide as octa hydrate crystals to a series of the reaction product of $P_2S_5$ and a butylene polymer having a molecular weight of about 700, steaming such mixtures at temperatures of 250° F., 300° F., and 350° F. for varying lengths of time and determining the barium contents of the neutralized products. This $P_2S_5$-olefin reaction product was obtained by reacting the butylene polymer with about 16% of $P_2S_5$ at a temperature of about 400° to 410° F., for ten hours, the reaction product then hydrolyzed by steaming at a temperature of about 385° F., the hydrolyzed product treated with about 13% clay at a temperature ranging from about 345° F. to 220° F., and then filtered. To the filtrate, substantially free of inorganic phopshorus acids, barium hydroxide, in the form of octa hydrate crystals, was added in an amount equivalent to 6.5% barium, and then steamed at various temperatures for various lengths of time. The barium content of the various products are tabulated in Table I.

*Table I*

| Steaming Time, Hours | Percent Barium Content, Steaming Temperature, ° F. | | |
|---|---|---|---|
| | 250 | 300 | 350 |
| 0 | 4.52 | 3.86 | 3.83 |
| 2 | 4.93 | 4.57 | 4.16 |
| 4 | 5.44 | 3.98 | 4.40 |
| 7 | 5.85 | 5.21 | 4.71 |

The data in the above table show the decrease in barium content of the products, steamed at temperatures above 250° F. with the greatest decrease in barium content being typical of the product steamed at temperatures in excess of 300° F.

While, as noted above, it is preferred to neutralize the phosphorus sulfide-hydrocarbon reaction products with barium hydroxide after such products are hydrolyzed and the inorganic phosphorus acids removed, the present invention is not restricted thereto but can be satisfactorily employed to neutralize phosphorus sulfide-hydrocarbon reaction products without being previously hydrolyzed. Furthermore, the removal of inorganic phosphorus acids from the hydrolyzed reaction product and the neutralization thereof can be accomplished in a single stage by adding a large excess of barium hydroxide to the hydrolyzed reaction product and steaming at temperatures within 220° F. to 300° F. Under these conditions the barium salts of the inorganic phosphorus acids are precipitated from the neutralized phosphorus acids. Upon separation of the precipitated barium salts by filtration or other suitable means, the barium derivative of the phosphorus sulfide-hydrocarbon reaction product substantially free of barium salts is obtained.

The barium derivatives of phosphorus sulfide-hydrocarbon reaction products obtained in accordance with the present invention are useful as additives in lubricant compositions used for the lubrication of internal combustion engines.

Percentages given herein and in the appended claims are weight percentages unless otherwise noted.

While we have described our invention by reference to specific embodiments thereof, the same are given by way of illustration only and are not intended as defining the breadth of the invention but includes within its scope such modifications and variations as come within the spirit of the appended claims.

We claim:

1. In the preparation of a barium-containing neutralized reaction product of a phosphorus sulfide and a normally liquid hydrocarbon in which the hydrocarbon is reacted with from about 1% to about 50% of a phosphorus sulfide at a temperature of from about 200° F. to about 600° F., and neutralized, the improvement comprising neutralizing the phosphorus sulfide-hydrocarbon reaction product by reacting the unneutralized phosphorous sulfide-hydrocarbon reaction product with at least stoichiometric amounts of barium hydroxide while steaming the mixture at a temperature of from about 220° F. to about 300° F.

2. The method of claim 1 in which the normally liquid hydrocarbon is an olefin polymer having a molecular weight of from about 500 to about 50,000.

3. The method of claim 1 in which the hydrocarbon is a butylene polymer having a molecular weight of from about 500 to about 50,000.

4. The method of claim 1 in which the hydrocarbon is a propylene polymer having a molecular weight of from about 500 to about 50,000.

5. In the preparation of a barium-containing neutralized reaction product of a phosphorus sulfide and an olefin polymer having a molecular weight of from about 500 to about 50,000, in which the olefin polymer is reacted with from 1% to about 50% of a phosphorus sulfide at a temperature of from about 200° F. to about 600° F., the reaction product hydrolyzed at a temperature of from about 220° F. to about 500° F., and the hydrolyzed product neutralized, the improvement comprising neutralizing the hydrolyzed product by reacting the hydrolyzed unneutralized phosphorus sulfide-olefin polymer reaction product with at least stoichiometric amounts of barium hydroxide while steaming the mixture at a temperature of from about 220° F. to about 300° F.

6. In the preparation of a barium-containing neutralized reaction product of a phosphorus sulfide and an olefin polymer having a molecular weight of from about 500 to about 50,000, in which the olefin polymer is reacted with from about 1% to about 50% of a phosphorus sulfide at a temperature of from about 200° F. to about 600° F., the reaction product hydrolyzed at a temperature of from 220° F. to about 500° F., the inorganic phosphorus acids formed by said hydrolysis removed, and the hydrolyzed phosphorus sulfide-olefin polymer reaction product substantially free of inorganic phosphorus acids neutralized, the improvement comprising neutralizing the hydrolyzed phosphorus sulfide-olefin polymer reaction product substantially free of inorganic phosphorus acids by reacting said hydrolyzed phosphorus sulfide-olefin polymer reaction product with at least stoichiometric amounts of barium hydroxide while steaming at a temperature of from about 220° F. to about 300° F.

7. The method of claim 6 in which the phosphorus sulfide is phosphorus pentasulfide.

8. In the preparation of a barium-containing neutralized reaction product of a phosphorus sulfide and an olefin polymer having a molecular weight of from about 500 to about 50,000 in which the olefin polymer is contacted with 1% to about 50% with a phosphorus sulfide at a temperature of from about 200° F. to about 600° F., the resultant reaction product hydrolyzed at a temperature of from about 220° F. to about 500° F., the hydrolyzed reaction product contacted with an adsorbent clay at a temperature of from 100° F. to about 500° F., to remove inorganic phosphorus acids formed by said hydrolysis, removing the clay from the hydrolyzed reaction product and neutralizing the clayed hydrolyzed product, the improvement comprising neutralizing the clayed hydrolyzed phosphorus sulfide-olefin polymer reaction product, substantially free of inorganic phosphorus acids, by reacting said unneutralized clayed hydrolyzed phosphorus sulfide-olefin polymer reaction product with at least stoichiometric amounts of barium hydroxide while steaming said mixture at a temperature of from about 220° F. to about 300° F.

ROGER W. WATSON.
CLAIR R. DITTO.

References Cited in the file of this patent

UNITED STATES PATENTS

| Number | Name | Date |
|---|---|---|
| 2,316,091 | White | Apr. 6, 1943 |
| 2,507,731 | Mixon et al. | May 16, 1950 |
| 2,516,119 | Hersh | July 25, 1950 |
| 2,534,217 | Bartleson | Dec. 19, 1950 |